United States Patent
Batra et al.

(10) Patent No.: US 7,773,560 B2
(45) Date of Patent: *Aug. 10, 2010

(54) REPEATED CHANNEL ADAPTIVE FREQUENCY HOPPING

(75) Inventors: Anuj Batra, Dallas, TX (US); Kofi Dankwa Anim-Appiah, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 78 days.

This patent is subject to a terminal disclaimer.

(21) Appl. No.: 12/189,473

(22) Filed: Aug. 11, 2008

(65) Prior Publication Data

US 2009/0022073 A1 Jan. 22, 2009

Related U.S. Application Data

(63) Continuation of application No. 10/004,304, filed on Nov. 2, 2001, now Pat. No. 7,411,926.

(51) Int. Cl.
*H04W 4/00* (2009.01)
(52) U.S. Cl. ...................................................... 370/330
(58) Field of Classification Search .................... None
See application file for complete search history.

(56) References Cited

U.S. PATENT DOCUMENTS

| | | | |
|---|---|---|---|
| 7,016,316 B2 * | 3/2006 | Stobart | 370/278 |
| 7,035,235 B2 * | 4/2006 | Jose | 370/330 |
| 7,411,926 B2 * | 8/2008 | Batra et al. | 370/330 |

\* cited by examiner

*Primary Examiner*—Anh-Vu Ly
(74) *Attorney, Agent, or Firm*—Steven A. Shaw; W. James Brady; Frederick J. Telecky, Jr.

(57) ABSTRACT

The invention provides systems, devices, and methods for frequency hopping. In one method embodiment, the invention hops between frequencies by using the same channel to transmit data from a master to a slave, and from the slave to the master. One system embodiment provides an enhanced master coupled to an enhanced slave. In one device embodiment, the invention is a computer readable medium adapted to enable frequency hopping in a frequency band.

1 Claim, 1 Drawing Sheet

REPEATED CHANNEL ADAPTIVE FREQUENCY HOPPING

CROSS REFERENCE TO RELATED APPLICATIONS

This application is a Continuation of U.S. patent application Ser. No. 10/004,304; filed on Nov. 2, 2001 entitled REPEATED CHANNEL FREQUENCY HOPPING, inventors Anuj Batra and Kofi Dankwa Anim-Appiah. Said application issued as U.S. Pat. No. 7,411,926 on Aug. 12, 2008.

TECHNICAL FIELD OF THE INVENTION

The invention generally relates to wireless access protocols, and, more particularly, the invention relates to devices and methods that enhance the operation of frequency hopping protocols, such as Bluetooth.

STATEMENT OF A PROBLEM ADDRESSED BY THE INVENTION

Wireless networks, such as Bluetooth, are a wireless replacements for low data-rate wired connections, such as parallel and serial cables. These networks operate in the 2.4 GHz Industrial, Scientific, and Medical (ISM) band. This technology is a Frequency-Hopping Spread Spectrum (FHSS) system that changes frequency (also called "hopping") at a rate of 1600 Hz over 79 1-MHz-wide channels (typically numbered channel zero, channel one, etc.). Over time, a Bluetooth signal actually occupies 79 MHz of the available 83.5 MHz in the ISM band. The channel access mechanism for a Bluetooth device is a slotted protocol.

Presently, a Bluetooth network consists of a single master and up to seven slaves. The master and the slave(s) are required to transmit on an even and an odd time slot, respectively. Time slots dedicated to the master are referred to as master-to-slave time slots, while the time slots dedicated to the slave are referred to as slave-to-master time slots. Each time slot spans 625 microseconds. Depending on the packet type selected by either the master or the slave, a Bluetooth packet can occupy 1, 3, or 5 time slots. The maximum data rate that a Bluetooth device can support is 1 Mbps.

The 2.4 GHz ISM band is an unlicensed band (meaning that anyone may use the spectrum of this band as long as they comply with the specified spectrum usage regulations.). This band has been set by the Federal Communications Commission (FCC) of the United States. Several other countries, including the majority of Europe, have also set aside this radio frequency (RF) spectrum as an unlicensed band. Some of the other devices that occupy this unlicensed band include IEEE 802.11 wireless networks and cordless phones. Interestingly, microwave ovens also radiate energy within this band.

Bluetooth networks use a frequency hopping mechanism, meaning that a Bluetooth transmission changes the transmission frequency after each packet. Accordingly, when another device is operating in a frequency that is also used by the Bluetooth network, mutual interference between Bluetooth and the other device operating in the 2.4 GHz ISM band can and does occur.

From the perspective of a Bluetooth device, these other devices appear as static interferers. The net effect of this interference is an increase in the packet error rate and a corresponding decrease in the effective data transfer rate (throughput). In fact, in the presence of interference, the data transfer rate (throughput) may drop to only a fraction of the maximum. The present invention describes a method for structuring the hopping sequence to minimize the effects of the static interference. This invention also describes a technique for generating the structured hopping sequence from the original (legacy) hopping sequence.

Interference Issues

Many wireless protocols, such as Bluetooth, are generally interference limited systems meaning that interference can limit throughput and packet transfer rates. The S-to-R (signal to noise ratio) requirement of wireless systems is such that the signal needs to be strong enough so that it can be discerned over system interference (noise), which enables data i.e. a packet to be demodulated. Some exemplary sources of interference in 2.4 GHz band include 802.11 networks, cordless phones, and microwave ovens. When interference is present, interference is the dominant source of degradation in Bluetooth systems. Even if there is no interference, Bluetooth may be limited by other factors, such as multipath problems. Multipath problems are where signal reflections that bounce off walls, trees, buildings, and other physical objects cause difficulty in signal reception and translation.

The 802.11 networks are a source of interference because 802.11 signals occupy the 2.4 GHz band. The 2.4 GHz is an unlicensed band, so anything that meets minimal FCC requirements as specified by the FCC is allowed to operate in the 2.4 GHz band. Hence, any other device that operates in the 2.4 GHz band will eventually collide with Bluetooth transmissions and create interference because the Bluetooth protocol hops (changes) its operational frequency through almost the entire band. Thus, if a Bluetooth transmission hops to a frequency where another device is transmitting, then the transmissions overlap in frequency. If they also overlap in time (occur at the same time), then a collision of transmissions occurs and interference results (basic physics teaches that two things cannot occupy the same space at the same time). Accordingly, interference from an 802.11 network degrades packet transmission, and degrades the ability to decode a packet.

A microwave oven is another device that produces interference in the 2.4 GHz band. So, if a microwave oven is operating in proximity to a Bluetooth network, then the Bluetooth network will eventually hop to a frequency including noise from the microwave oven. Thus, Bluetooth packets will likely be lost and the system will suffer degradation and decreased throughput. In addition, some cordless phones are 2.4 GHz devices and are thus another source of interference because they also occupy the 2.4 GHz band.

Cordless devices and networks usually employ an upstream channel and a downstream channel each separated in frequency, which is known as "frequency division duplex." So, as interference increases, the throughput for Bluetooth-based networks and devices drops and the packet error rate (PER) increases. Thus, to increase throughput in an interference limited environment, a Bluetooth device must use some kind of "coexistence mechanism", or, in other words, it must have some mechanism that can recognize interference, and then do something intelligently to either eliminate the interference or to deal with the interference.

The present invention describes a method for structuring the hopping sequence to reduce effects of static interference. The invention also describes a technique for generating the structured hopping sequence from the original (otherwise known as the "legacy") hopping sequence.

SUMMARY OF THE INVENTION

The present invention provides technical advantages as systems, devices, and methods for frequency hopping. In one method embodiment, the invention hops between frequencies by using the same channel to transmit data from a master to a slave, and from the slave to the master. One system embodiment provides an enhanced master coupled to an enhanced slave. In one device embodiment, the invention is a computer readable medium adapted to enable frequency hopping in a frequency band. Accordingly, the invention reduces packet loss, improves Bluetooth network throughput, and provides a level of Quality of Service (QoS). In other embodiments, the invention provides enhancements of Bluetooth systems and devices for implementing the method.

The invention provides substantial benefits for both the ACL and SCO links. For example, for the ACL link the invention provides improves throughput when interference is present, it minimizes the transitions from a good channel to a bad channel and the transitions from a bad channel to a good channel. Note that typically, a transition occurs from a master-to-slave slot (even slot), or a slave-to-master slot (odd slot). So when one references a transition from a good channel to a bad channel, one means that there is a good channel on the master-to-slave slot and a bad channel on the slave-to-master slot. In the method, a transition from a good channel to a bad channel results in the retransmission of both the master's packet and the slave's packet (reduces the amount of available bandwidth). Also, a transition from a bad channel to a good channel results in unused resources (idle slot on the slave-to-master slot) and a retransmission of the master's packet (reduces the amount of available bandwidth). Accordingly, the invention takes into account the fact that packet transmissions may require more than one slot to complete.

Similarly, for the SCO link, the invention provides a level (nearly consistent) of QoS (Quality of Service) because the grouping ensures that there is a symmetric distribution of good and bad channels for both directions of the voice link. Furthermore, some general benefits of imposing a structure on the hopping sequence include the fact that minimal changes are made to the hardware and software of existing Bluetooth devices. In addition, the invention allows for rapid detection of a bad channel. Thus, if an enhanced master sends a message to an enhanced slave and does not hear a response, then this is a very good indication that the channel is bad. In the prior art case, there is no way to determine if the master-to-slave frequency is bad or the slave-to-master frequency is bad. (Note that in the legacy case, the master-to-slave frequency is typically different, and in fact almost always different, from the slave-to-master frequency).

Other features and benefits of the invention are that all of the channels are used evenly, that the method works with all known packet types and all known packet lengths, and that the method is easily used in conjunction with structured adaptive hopping techniques and reduced frequency hopping techniques. In addition, the invention supports legacy devices, because the master's transmission hopping frequencies remain unchanged. Also, the master's transmission hopping frequency is preferably not altered. Furthermore, the method allows for all types of Bluetooth devices (legacy and enhanced via repeated channel adaptive frequency hopping) to maintain synchronization, because Bluetooth devices always know on which hopping frequencies the master is going to transmit. As a final example of a benefit of the invention, the invention supports enhanced Bluetooth devices that can support broadcast messages that are sent to all devices in the piconet, whether they are enhanced or legacy devices.

Of course, other features and embodiments of the invention will be apparent to those of ordinary skill in the art. After reading the specification, and the detailed description of the exemplary embodiment, these persons will recognize that similar results can be achieved in not dissimilar ways. Accordingly, the detailed description is provided as an example of the best mode of the invention, and it should be understood that the invention is not limited by the detailed description. Accordingly, the invention should be read as being limited only by the claims.

BRIEF DESCRIPTION OF THE DRAWINGS

Various aspects of the invention, as well as an embodiment, are better understood by reference to the following EXEMPLARY EMBODIMENT OF A BEST MODE. To better understand the invention, the EXEMPLARY EMBODIMENT OF A BEST MODE should be read in conjunction with the drawings in which.

AN EXEMPLARY EMBODIMENT OF A BEST MODE

Introduction

Figure 1:
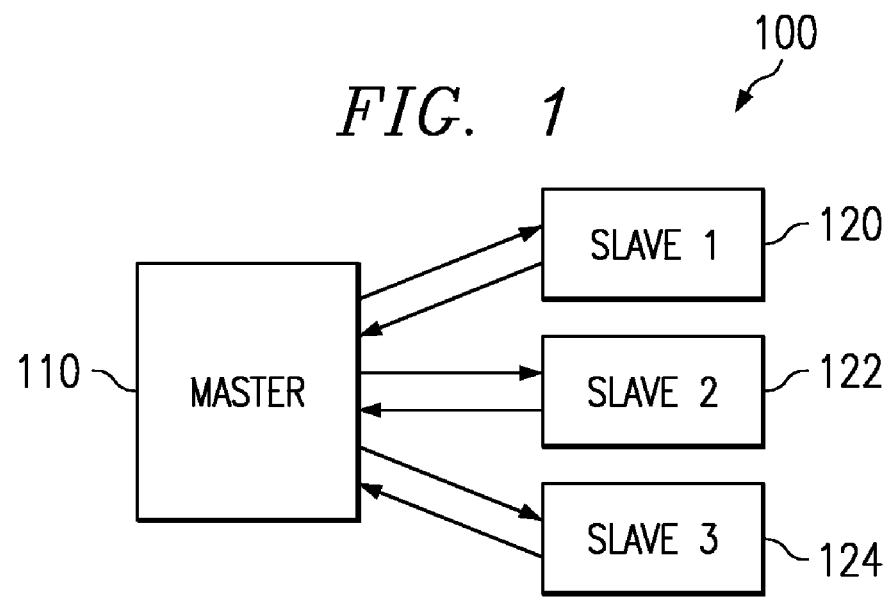
FIG. 1 illustrates a wireless system according to the teaching of the invention.

The invention provides a new and useful channel hopping (or frequency changing) sequence and system using such sequence. Frequency bands are divided into many channels. For example, the FM Radio band is divided into many FM channels, each capable of transmitting a separate stereo event. Current law (for wireless computer networks that hop) requires that, over time, every channel in a defined channel band be used, regardless of channel quality. Furthermore, law requires that, over time, each channel be used an approximately equal number of times. However, since data (hereinafter meaning data, voice, video, or any other network transmission) may take several time periods (called slots) to transfer, and since typically a channel is changed for each time slot, when a bad channel is encountered, poor system performance results. For example, hopping into a bad channel results in the loss of all previously sent data, and requires that additional "handshaking," or connection protocols, be used to re-establish the transmission of the data. The invention greatly reduces these problems.

Accordingly, the invention enables repeated channel adaptive frequency hopping. The invention hops between frequencies by using the same channel to transmit data from a master to a slave, and from the slave to the master, typically by using an enhanced master coupled to an enhanced slave.

Recall that a Bluetooth device hops over 79 different channels. The exact hopping sequence for the network (also called a "piconet") is determined by the address, as well as the clock of the Bluetooth master. Each hop represents a time slot during which a Bluetooth device can transmit a packet. A time-division duplex (TDD) scheme is used to control the access to the medium. In this scheme, the master and slave are allowed to transmit on the even and odd slots, respectively. Each device may transmit packets that can occupy 1, 3, or 5 time slots. The RF frequency for a hop will remain fixed for the duration of a packet. For the case of a multi-slot packet, the Bluetooth device will use the RF frequency associated with the first slot for the entire length of the packet.

Two different types of links can be established between the master and slave(s): a synchronous connection-oriented (SCO) link, and an asynchronous connection-less (ACL) link. The SCO link is a symmetric, point-to-point link between the master and any single slave within the piconet. Since the SCO link typically supports time-bounded information like voice, the SCO packets are never retransmitted. The master maintains the SCO link with the slave by reserving slots at regular intervals. The master transmits SCO packets in the reserved master-to-slave slots, while the SCO slave always responds in the following slave-to-master slot. Even though an SCO packet only occupies a single slot, its frequency of transmission depends on the coding scheme used. An SCO packet protected with a rate 1/3 FEC (HV1) is transmitted every other slot, while an SCO packet protected with a rate 2/3 FEC (HV2) is transmitted every fourth slot. A SCO packet not protected by FEC (HV3) is transmitted every sixth slot.

The ACL link is a point-to-multipoint link between the master and all of the slaves. During slots not reserved for the SCO link(s), the master can establish an ACL link on a per-slot basis with any slave in the piconet, including slave(s) already engaged in an SCO link. Note that only a single ACL link can exist between a master and a slave. Because ACL packets typically convey data, an ARQ protocol is used to maintain the integrity of the transmitted information. For an ACL link, the Bluetooth master is truly the master of the piconet. For example, a slave can only respond with an ACL packet in the slave-to-master slot if and only if it has been successfuly addresses in the preceding master-to-slave slot. Depending upon the packet type, an ACL packet can occupy 1 (DM1/DH1), 3 (DM3/DH3), or 5 (DM5/DH5) slots.

Description of Figures

FIG. 1 illustrates a wireless system 100 according to the teaching of the invention. The wireless system 100 comprises at least a master 110 and one slave. A master is generally a device that sends commands to other devices in the network. A slave is a network device that generally accepts and executes commands from a master. The master 110 is preferably a computing device, such as a server, and preferably maintains its own processing means, such as a computer processor or a digital signal processor. In addition, the master 110 is enabled to communicate wirelessly with a slave device (slave). For example, a first slave 120 (slave1), second slave 122 (slave2) and third slave 124 (slave3) accept commands from the master 110 (as illustrated by the lines originating from the master and pointing to the slave). A slave may be active, meaning that the slave maintains its own processing power, or the slave may be passive. Common passive clients include a "thin client" or a remote display. Each slave 120, 122, 124 is capable of responding to the master 110, as illustrated by the arrows originating at the slaves 120, 122, 124 and terminating at the master 110. The mater 110, and the slaves 120, 122, 124 may be referred to as "enhanced" machines (enhanced master and enhanced slave(s)) since they maintain software and any hardware needed to implement an enhanced hopping sequence algorithm.

Figure 2:
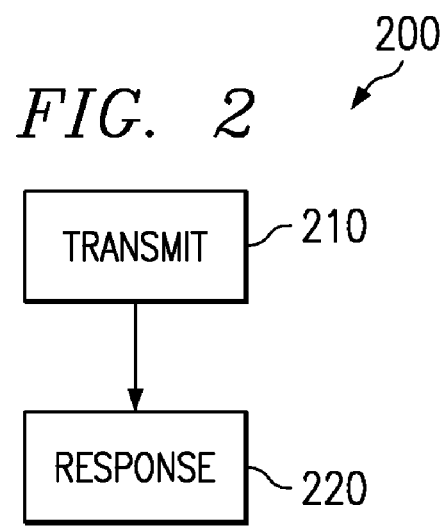
FIG. 2 illustrates an enhanced hopping sequence algorithm.

Accordingly, FIG. 2 illustrates an enhanced hopping sequence algorithm 200. The enhanced hopping sequence algorithm (the algorithm) 200 begins with a transmit act 210. In the transmit act 210 a master sends a communication to a slave across a channel (preferably the master selects a channel, either randomly, or as directed by a channel selection algorithm). In a preferred embodiment, the channel is a good channel. Then, in a response act 220, the slave that received the communication or command from the master responds to the master. When the slave communicates with the master, the slave devices uses the same channel to send information to the master as the master used to send information to the slave. Preferably, the transmission from the slave to the master takes place in the time slot immediately following the time slot in which information was received by the slave.

If an enhanced master transmits a packet to an enhanced slave, then this method forces that particular enhanced slave to respond on the same frequency the master used to send that packet. The remaining enhanced slaves (that were not "contacted" by the master with the transmission) in the piconet will hop to additional channels according to the original hopping sequence. Thus, it is preferred that the only time an enhanced slave will transmit on a frequency different than the one generated by the legacy hop kernel is when the packet is specifically addressed to that enhanced slave. In all other cases, the enhanced slave(s) will use the hopping frequency generated by the legacy hop kernel. This method applies to both ACL (Asynchronous Connection-Less) link and SCO (Synchronous Connection-Oriented) links.

When the enhanced slave has been addressed in the master's packet, the enhanced slave will repeat the enhanced master's hopping (transmission) frequency. (this is a reason why this method may be called Repeated Channel Adaptive Frequency Hopping). Note that the enhanced master should listen for a reception on the same frequency that it used to transmit, in order to hear the enhanced slave's reply. Furthermore, this frequency hopping method does not alter the master's original transmission frequencies. When one of the two devices exchanging information is not an enhanced device (either the master or the slave), both devices communicate via the legacy hopping sequence. In this case, no changes are made to the hopping frequencies.

Exemplary Implementation

As an example, there is a wireless system that uses 79 channels, numbered 0-78. Classify channels 0-58 as good and channels, and 59-78 as bad. Table 1 provides a hopping sequence for a wireless system. In the first column, the direction of the information transfer is specified. The second column provides an "original" hopping sequence, and the third column provides the hopping sequence implemented when an enhanced hopping sequence algorithm is implemented in the system. In the table, a G means the associated channel is a good channel, and a B means the associated channel is a bad channel. Accordingly, there is an original hopping sequence (OHS):

OHS: 8 66 10 12 59 14 52 74 37 70 1 18 69 20

Above, the "Good" Channels are bolded.

| Packet direction | original hopping sequence | repeated channel adaptive hopping sequence |
| --- | --- | --- |
| Master-to-slave1 | 8 (G) | 8 (G) |
| Slave1-to-master | 66 (B) | 8 (G) |
| Master-to-slave2 | 10 (G) | 10 (G) |
| Slave2-to-master | 12 (G) | 10 (G) |
| Master-to-slave1 | 59 (B) | 59 (B) |
| Slave1-to-master | 14 (G) | 59 (B) |
| Master-to-slave3 | 52 (G) | 52 (G) |
| Slave3-to-master | 74 (B) | 52 (G) |
| Master-to-slave1 | 37 (G) | 37 (G) |
| Slave1-to-master | 70 (B) | 37 (G) |
| Master-to-slave1 | 1 (G) | 1 (G) |
| Slave1-to-master | 18 (G) | 1 (G) |
| Master-to-slave1 | 69 (B) | 69 (B) |
| Slave1-to-master | 20 (G) | 69 (B) |

In the first time slot, the master transmits a packet to slave1 on channel 8. In the second time slot, the original hopping sequence has designated a bad channel (66) for use. Accordingly, if slave1 were a legacy slave device, then it would reply back to the master on channel 66(illustrated in the middle column). However, since slave1 is an enhanced slave, then it responds to the master by using the same channel the master used to first communicate with slave1 (channel 8—as illustrated in the far-right column).

Channel 10is selected as the channel of transmission for the third time slot. Therefore, the master transmits a packet to slave2 on channel 10. Similar to the above, if slave2 were a legacy device, then it would reply back to the master on the channel that is chosen as the next channel in the hopping sequence, channel 12. However, since slave2 is an enhanced device, then it replies to the master on the same channel the master used, which is channel 10. Note that here the absence of the enhancement would not have resulted in a higher data rate. Accordingly, it should be noted that although in one embodiment the algorithm may be turned on or off as needed to increase the data rate, here, only the enhanced algorithm is used.

Next, the master transmits a packet to slave1 on channel 59. In a preferred embodiment, a bad channel is used even though no data will be received by the slave device. This insures compliance with FCC rulings that require that all channels in a network be used, which effective requires that a certain number of bad channels be used. Accordingly, if slave1 were a legacy device, then it would reply back to the master on channel 14. However, since slave1 is an enhanced slave, it replies using the same channel the master used to send data (channel 59). This provides a level of predictability in the transmissions since it is known that neither the master's transmission nor the slave's transmission will be completed. Thus, the system knows that in a preferred embodiment, the entire communication sequence between the master and the slave should be repeated. In this example, the enhanced slave using the repeated channel adaptive frequency hopping mechanism always responds to the master on the slave channel it used to receive the master's packet. Note that these transmissions do not depend on the type and length of the Bluetooth packet. Accordingly, in the algorithm is independent of packet type and packet length. The additional packet transmissions illustrated in the table are provided for further exemplary purposes and proceed in a manner similar to that shown above.

Furthermore, it is desired to some extent to have bad channels grouped together, and good channels grouped together. The Table shows that the good and bad channels seem to appear randomly in the original hopping sequence. However, in the repeated channel adaptive frequency hopping sequence, a natural grouping occurs. Accordingly, there are four good channels, followed by two bad channels, followed by six good channels, and then followed by two bad channels. Therefore, the repeated channel adaptive frequency mechanism can generate a sequence with several good channels and several bad channels in a row with very little complexity.

This method is a simple way to guarantee that the sequence of transmission frequencies has several good channels and several bad channels in a row. Each block of good and bad channels will have a length that is a multiple of two. The exact length of the good and bad blocks will be a function of the underlying hopping sequence.

Sometimes methods of the invention may be practiced by placing the invention on a computer-readable medium. Computer-readable media include passive data storage, such as a random access memory (RAM) as well as semi-permanent data storage such as a compact disk read only memory (CD-ROM). In addition, the invention may be embodied in the RAM of a computer and effectively transform a standard computer into a new specific computing machine.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. A method of communication in a frequency hopping wireless network using a time-division duplex (TDD) scheme having a plurality of time slots divided into a plurality of master-to-slave slots and a plurality of slave-to-master slots, wherein the plurality of master-to-slave slots are even slots and the plurality of slave-to-master slots are odd slots, said method comprising:

coupling an enhanced master device with one or more slave devices;

communication in the network is initiated by the enhanced master device, which means that a regular slave device or enhanced slave device can only respond with a packet after the enhanced master has sent a packet to the regular slave device or enhanced slave device;

selecting a channel from an original hopping sequence when the master communicates with either a regular slave device or an enhanced slave device;

selecting a channel from the original hopping sequence when the regular slave device communicates with an enhanced master device; and selecting a channel in a repeated channel adaptive hopping sequence, derived from the original hopping sequence, when an enhanced slave communicates with an enhanced master device, wherein, at any one time instant, only a single device can be transmitting within the network.

* * * * *